(12) United States Patent
Hsiao

(10) Patent No.: US 6,339,269 B1
(45) Date of Patent: Jan. 15, 2002

(54) MOTOR WITH IMPROVED HEAT DISSIPATION EFFECT

(75) Inventor: Shuem-Shing Hsiao, Taichung (TW)

(73) Assignee: Hiwin Mikrosystem Corporation, Taichung (TW)

( * ) Notice: Subject to any disclaimer, the term of this patent is extended or adjusted under 35 U.S.C. 154(b) by 0 days.

(21) Appl. No.: 09/663,138

(22) Filed: Sep. 15, 2000

(30) Foreign Application Priority Data

Mar. 3, 2000 (TW) .......................................... 89103755

(51) Int. Cl.[7] .............................. H02K 9/00; H02K 1/20
(52) U.S. Cl. ...................................... 310/64; 310/60 A
(58) Field of Search ............................ 310/16, 11, 52, 310/54, 55, 57, 58, 59, 64

(56) References Cited

U.S. PATENT DOCUMENTS

| 5,128,569 A | * | 7/1992 | Gladish | 310/12 |
| 5,783,877 A | * | 7/1998 | Chitayat | 310/12 |

* cited by examiner

Primary Examiner—Nestor Ramirez
Assistant Examiner—Guillermo Perez
(74) Attorney, Agent, or Firm—Bacon & Thomas

(57) ABSTRACT

A heat dissipation device for handy, effective, and cost saving heat dissipation for all kinds of motors utilizing a plurality of thermal conducting pipes filled with an easily evaporative liquid and a capillary material disposed uniformly in the surroundings of windings and in the core slots. These pipes are brought to be in contact with a heat dissipation plate and can be further communicated with a circulating refrigerant.

10 Claims, 8 Drawing Sheets

(a)

(c)

(b)

(d)

MOTOR WITH IMPROVED HEAT DISSIPATION EFFECT

BACKGROUND OF THE INVENTION

1. Field of the Invention

The present invention relates to a motor with improved heat dissipation effect, and more particularly, to heat dissipation means for linear motor.

2. Description of the Prior Art

A stator and a rotor are two essential components of a motor. In general, the stator has armature windings for carrying load current, and the rotor is provided with a magnetic field formed of field windings on an iron core of laminated sheet steel. After the field windings are ready, the insulating material for example, epoxy resin, or other equivalents are enclosed over the windings and the core. With this structure, the motor converts electric energy to rotating torque according to the Fleming's left hand rule.

The energy of a motor is partially converted into heat which in turn gives rises to increase of winding resistance and $I^2R$ loss of the motor. As a result, the temperature rise of the motor is exacerbated to greatly lower the motor efficiency. It is well understood that both the stator and rotor is hard to cool down especially in the case the windings and the core are enclosed with thermal insulating epoxy resin.

The motor may be classified into rotating type and linear type. In the rotating type, the motor can be equipped with ventilation means such as cooling fans or providing ventilation holes through the laminated core so as to take away heat generated during operation of the motor. Unfortunately, such means are not applicable to a linear motor so that certain other heat dissipation mechanism must be added to it.

FIG. 6 shows conventional means for heat dissipation in a linear motor. In this case, the mover 25 of the linear motor includes an iron core 19 with field windings 20 wound on the iron core 19, and a heat dissipation plate 18 attached on top of the core 19, or attached to the front or the rear end, or to both sides. By heat exchange function performed by a refrigerant flowing in the cooling pipes contained in the heat dissipation plate 18, heat is carried out of the motor. However, in this case, only the heat existing on the uppermost part or on both sides of the mover 25 can be dissipated, dissipation of heat loitering at the center portion of the core 19 and in the field windings is not easy and the heat dissipation efficiency for the entire motor is quite poor.

Another improvement made by U.S. Pat. No. 4,839,545 to upgrade the heat dissipation effect is shown in FIG. 7. As shown in FIG. 7, a plurality of silicon sheet steels 21 for the mover 26 are formed into various configurations so as to facilitate burying refrigerant contained cooling pipes into a meandering groove 22 on the sheet steels 21. Meanwhile, several sets of expensive dies have to be prepared for complicated fabricating process. Besides, the mover 26 becomes bulky for the resin containing cooling pipes therein. Moreover, refrigerants are generally corrosive so that the motor windings are apt to be damaged in case of leakage of refrigerant.

Another well-known heat dissipation means for a linear motor was provided by U.S. Pat. No. 5,751,077. In this disclosure, the principles of cooling an oil immersed transformer is employed wherein by filling a none electric and magnetic conducting liquid into a housing of the mover. Meanwhile, for perfectly carrying out the advantage of this design, a perfectly leak proof mover housing must be provided at first, which is not only difficult in manufacturing, but also expensive for production cost. Besides, weight of the mover will be inevitably increased, and an additional device for circulation of the cooling liquid in the mover with other external equipment for heat exchange. One thing more, the fear of damaging electrical circuit of the motor in case of leakage of refrigerant still remains unsolved!

Another solution for heat dissipation of a linear motor is shown in FIG. 8. A linear motor 27 is composed of a stator 28 and a mover 29, pressurized air 23 is blown onto the surface of the mover 29. Incidentally, in this method, the heat hidden in the inner part of the mover 29 enclosed by an epoxy resin layer or other equivalents 24 is hard to expel. Besides, additional cost for preparing an air compressor together with an air reservoir is considerably expensive.

SUMMARY OF THE INVENTION

The present invention has been made in order to eliminate the inconvenience and disadvantages inherent to the conventional techniques as mentioned above. The essential object of the present invention is to provide heat dissipation means for a linear motor, with such means, the heat produced by the motor can be effectively carried away therefrom so as to perform heat dissipation with a high efficiency heat exchange procedure.

In the present invention, thermal conducting pipes and a heat dissipation gel instead of conventional cooling circulation pipes buried in the iron or windings. With this structure, the small sized light weighted, and non-ferrite heat conducting pipes are able to be buried deeply into the core or windings of the motor beneath the epoxy resin so as to perform highly efficient heat dissipation.

In the present invention a thermal conducting pipe is used, comprising a closed, vacuum-tight envelope, a porous lining called a "wick structure", and a moving fluid. The thermal conducing pipe, also known as a heat pipe, is an efficient heat transfer device recently used in the electronics industry, especially in laptop computers. The thermal conducting metallic tubes are almost completely evacuated, filled with a small amount of special liquid materials, for example, methane or acetone having a low boiling point, and a material with capillary characteristics. As the pipes are heated, pressure variation in the pipes causes evaporation of the liquid with the result that vaporized liquid flows with a very high velocity from a high temperature region to a low temperature region. As soon as the vaporized liquid comes in contact with the wall surface of the metallic pipes at the low temperature region, heat is conducted to the wall surface of the low temperature metallic pipes. After having released the heat energy, vaporized liquid restores its liquid state and flows back to the high temperature region with the aid of gravity or by capillary action of the capillary material. By such repeated circulation, the heat produced by copper loss and iron loss during operation of the motor is carried away from the iron core and the windings directly outside through the metallic pipes without detention by the epoxy resin layer.

In the present invention, for further enhancing heat dissipation effect, a metallic heat dissipation plate is attached to the outer surface of the mover, the heat dissipation plate is in contact with the metallic pipes so as to assist the heat dissipation thereof. During operation, the heat is dissipated to the air from the heat dissipation plate without providing any additional means for forced cooling. Fins can be provided for the heat dissipation plate to increase contact area with air thereby improving heat dissipation effect.

In the present invention, a recirculating circuit for refrigerant can be formed in the heat dissipation plate which is in contact with the thermal conducting metallic pipes for assisting to dissipate heat to the air in the case of a large motor producing great amount of heat. However, the metallic heat dissipation plate is located far away from the core and windings so that there is no fear of leakage of refrigerant which might cause a short circuit of the motor.

In the present invention, a thermal conducting gel can be filled between the metallic thermal conducting pipes and the heat dissipation plate thereof for further improving the thermal conducting effect.

Besides, the technique of the present invention is all applicable to a rotating motor.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

Figure 1:
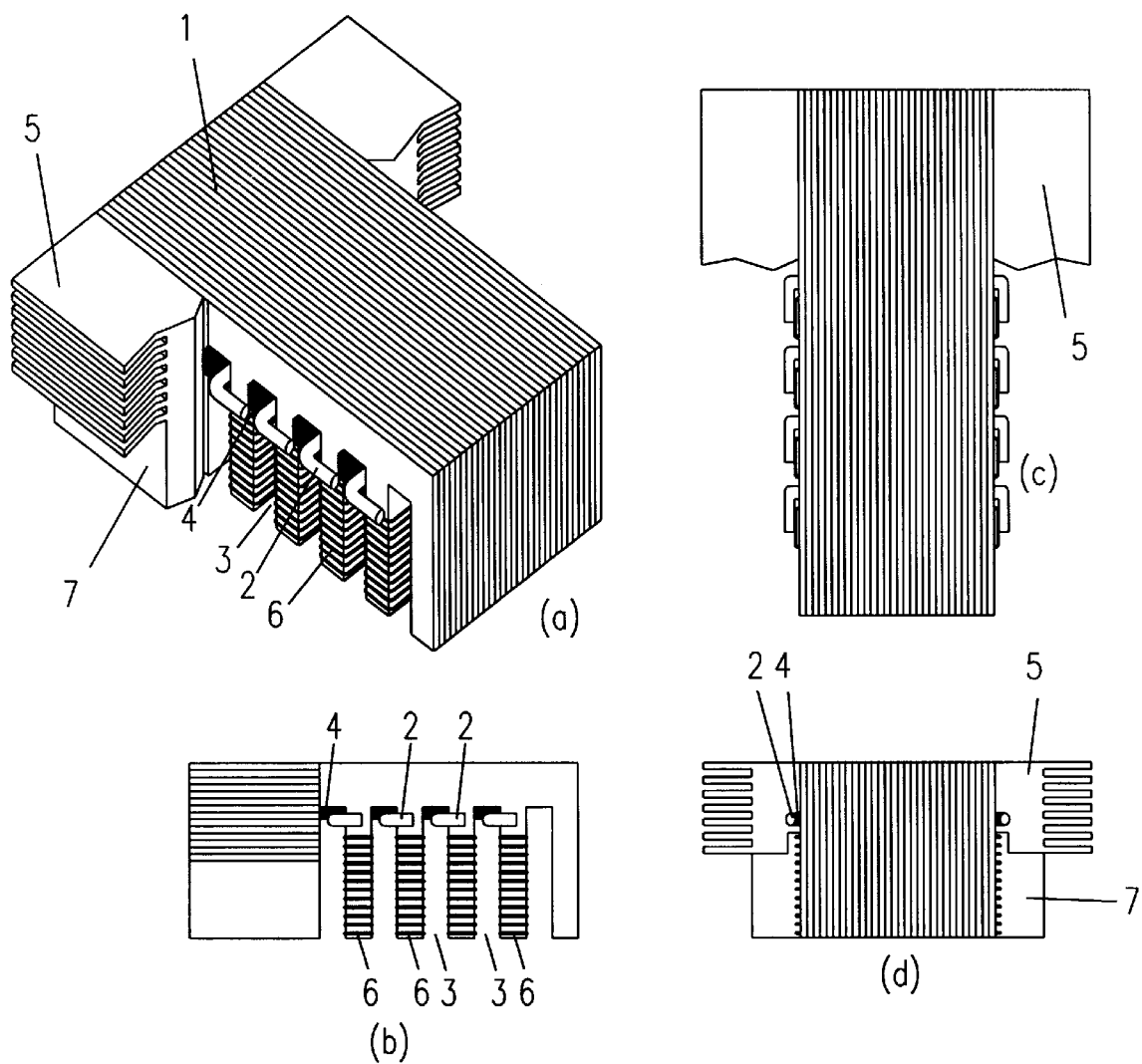
FIG. 1(a) is a three dimensional exploded view in an embodiment of the present invention.
FIG. 1(b) is a side view of FIG. 1(a)
FIG. 1(c) is a top view of FIG. 1(a)
FIG. 1(d) is a front view of FIG. 1(a)

FIG. 1 consists of four sub-drawings (a), (b), (c) and (d) respectively expressing a three dimensional exploded view, a side view, a top view, and a front view. The mover of a linear motor includes an iron core and field windings, the iron core is formed of a stack of laminated sheet steels 1, and the windings are wound around the core. The highly thermal conducting pipes 2 are disposed in slots 3 of the laminated sheet steel core 1. Since the clearances between the thermal conducting pipes 2 and the steel core 1 might increase thermal reluctance so as to degrade thermal conductivity, the clearances there between are filled with thermal conducting gel 4 for lowering thermal reluctance, on the other hand, it has an effect of fastening the thermal conducting pipes 2 thereat.

In a conventional moving core linear servo motor, when the windings 6 are carrying current, windings 6 get a poor thermal conducting effect because the heat dissipation is detained by an epoxy resin layer 7 having a very poor thermal conductivity and enclosing the windings 6. In the present invention, the heat loitering or accumulating in the epoxy resin layer 7 is conducted therefrom by the thermal conducting pipes 2 with one end being inserted into the epoxy resin layer 7, and the other end being stretched out of the epoxy resin layer 7 thereby providing a passage for releasing heat outside. For further enhancing the above-mentioned heat releasing effect, the other end of the pipe 2 is buried in a metallic heat dissipation plate 5, whose surface has a plurality of fins. Furthermore, a thermal conducting gel 4 can be filled into the clearances between the pipes 2 and plate 5 for lowering thermal reluctance there between and assisting to tightly fastening the pipes 2 in the plate 5. Besides, the heat exchange effect of the plate 5 with external air may be improved by means of additional refrigerant circulation pipes provided in the plate 5.

Figure 2:
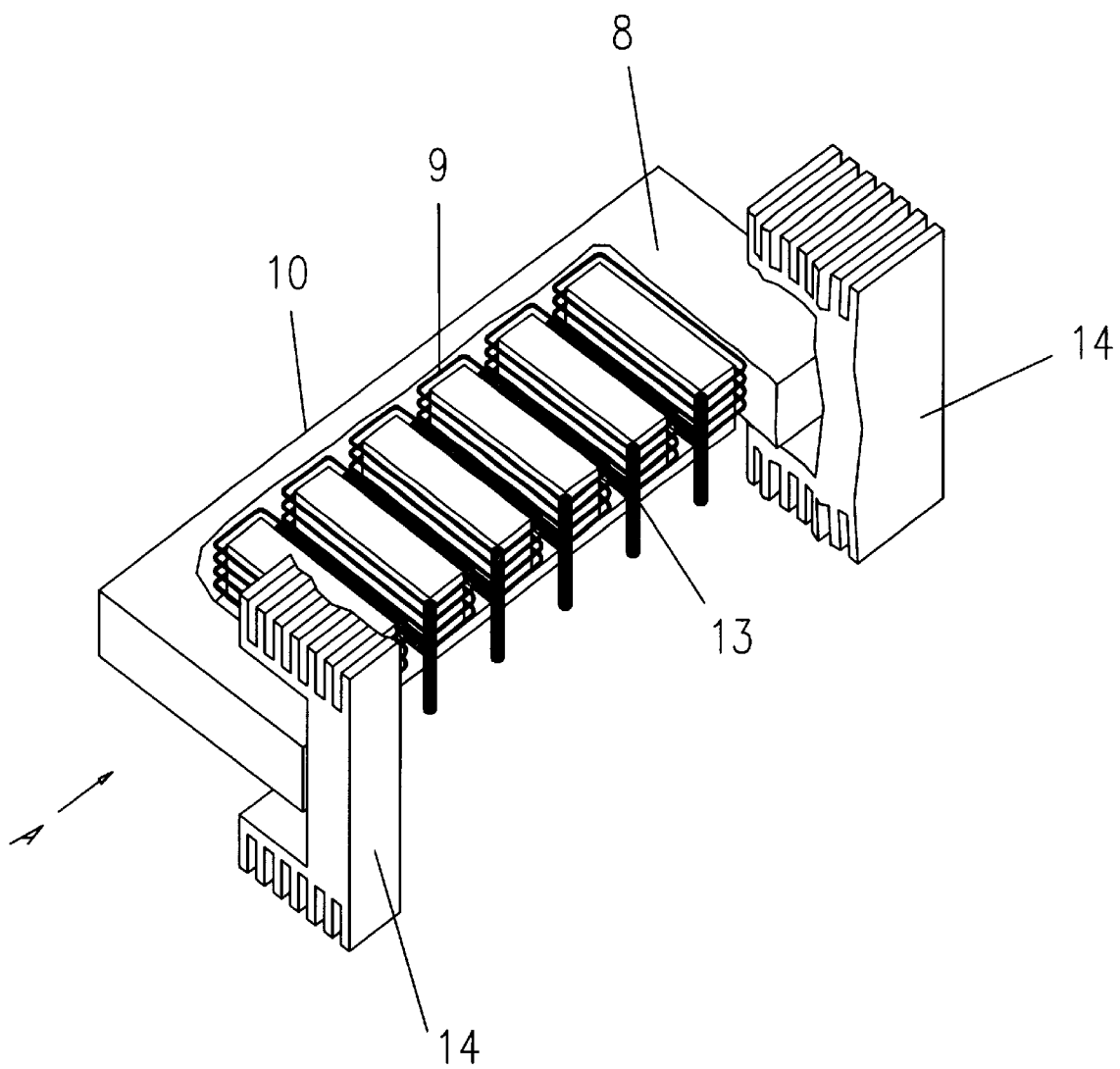
FIG. 2 is view of a second embodiment of the present invention which is applied to a coreless linear servo motor.
Figure 3:
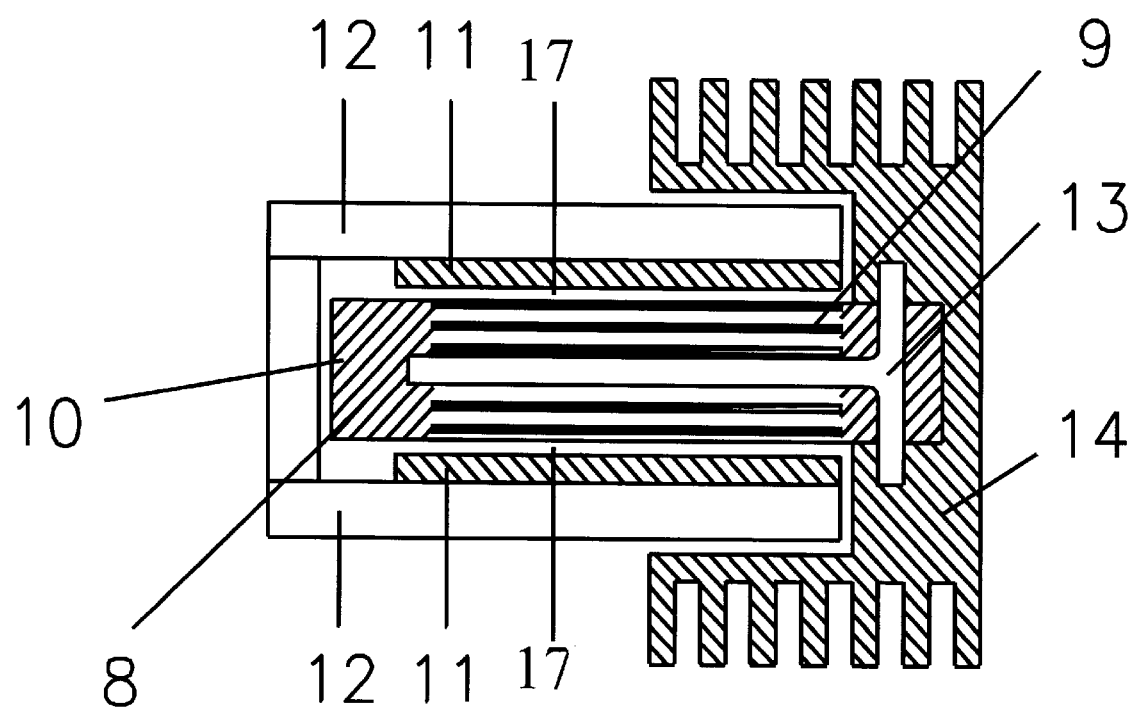
FIG. 3 is a side cross sectional view of FIG. 2.

FIG. 2 is a view of a second embodiment of the present invention which is applied to a coreless linear servo motor, and FIG. 3 shows its side cross sectional view. The heat of this type of linear motor is generated by the mutual reaction of an electromagnetic field built-up by current in windings 9 of the mover 10 and a permanent magnet 11 in a stator 12. In this embodiment, the stator 12 is divided into upper and lower layers, whereas mover 10 is interposed between the two stators with a definite gap 17 and movable in accordance with a guide mechanism. The mover 10 is enclosed with an epoxy resin layer 8 having a poor thermal conductivity so that the heat accumulated in the inner part of the mover 10 is hard to be dissipated. In the present invention, the heat loitering or accumulating in the epoxy resin layer 8 is conducted therefrom by the thermal conducting pipes 13 with one end being inserted into the epoxy resin layer 8 near the winding 9 and the other end being stretched out of the epoxy resin layer 8 thereby providing a passage for releasing heat outside. With this structure, the heat accumulated in the windings 9 can be more directly and promptly carried out than cooling the mover with cooling air blown from outside as that employed by the conventional technique.

Figure 4:
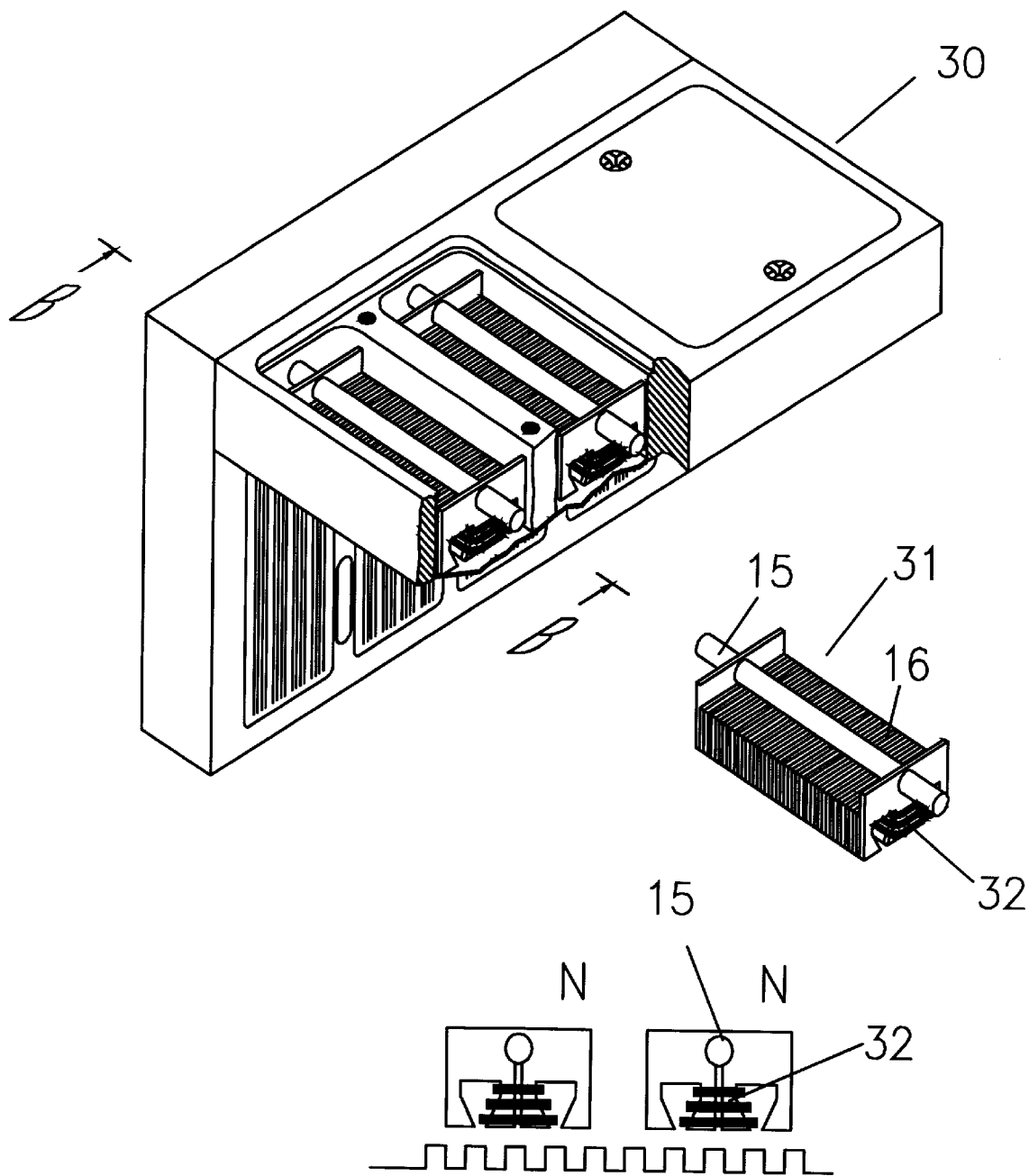
FIG. 4 is a view of a third embodiment of the present invention which is applied to a general linear pulse motor.
Figure 5:
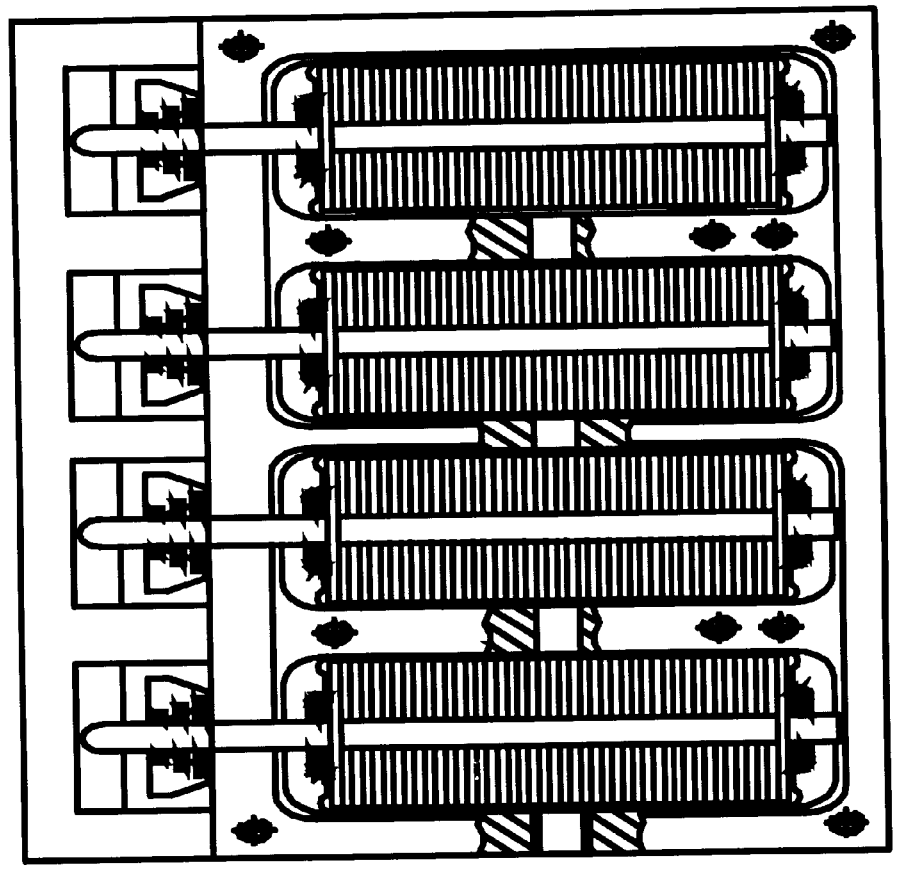
FIG. 5 is a cross sectional view cut along line B—B in FIG. 4.
Figure 5:
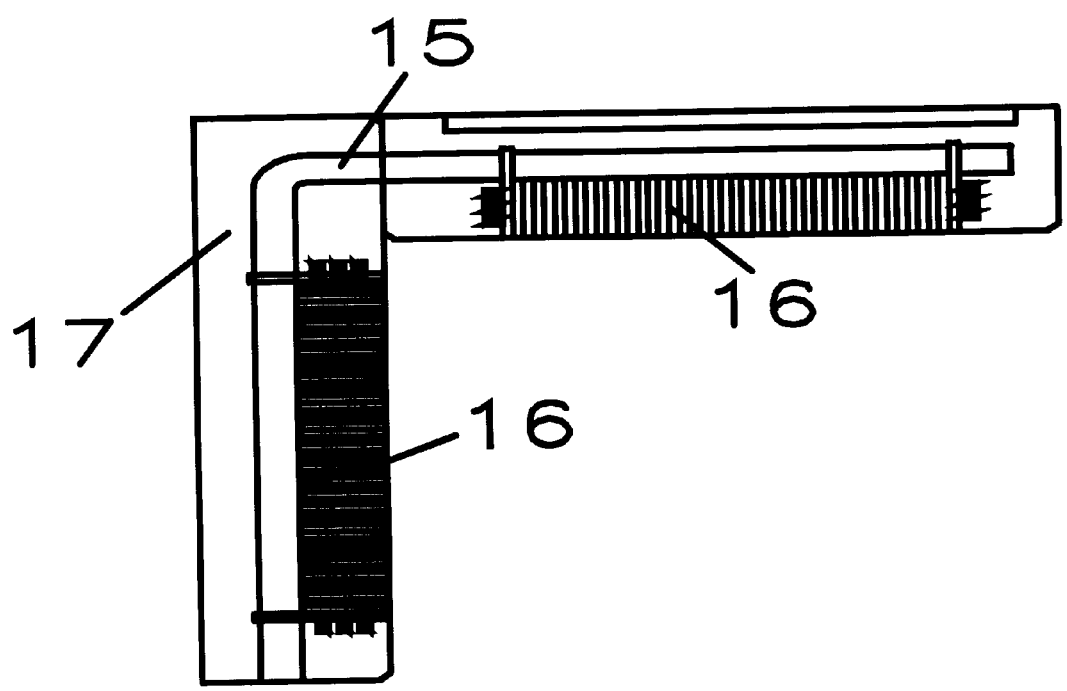
Figure 6:
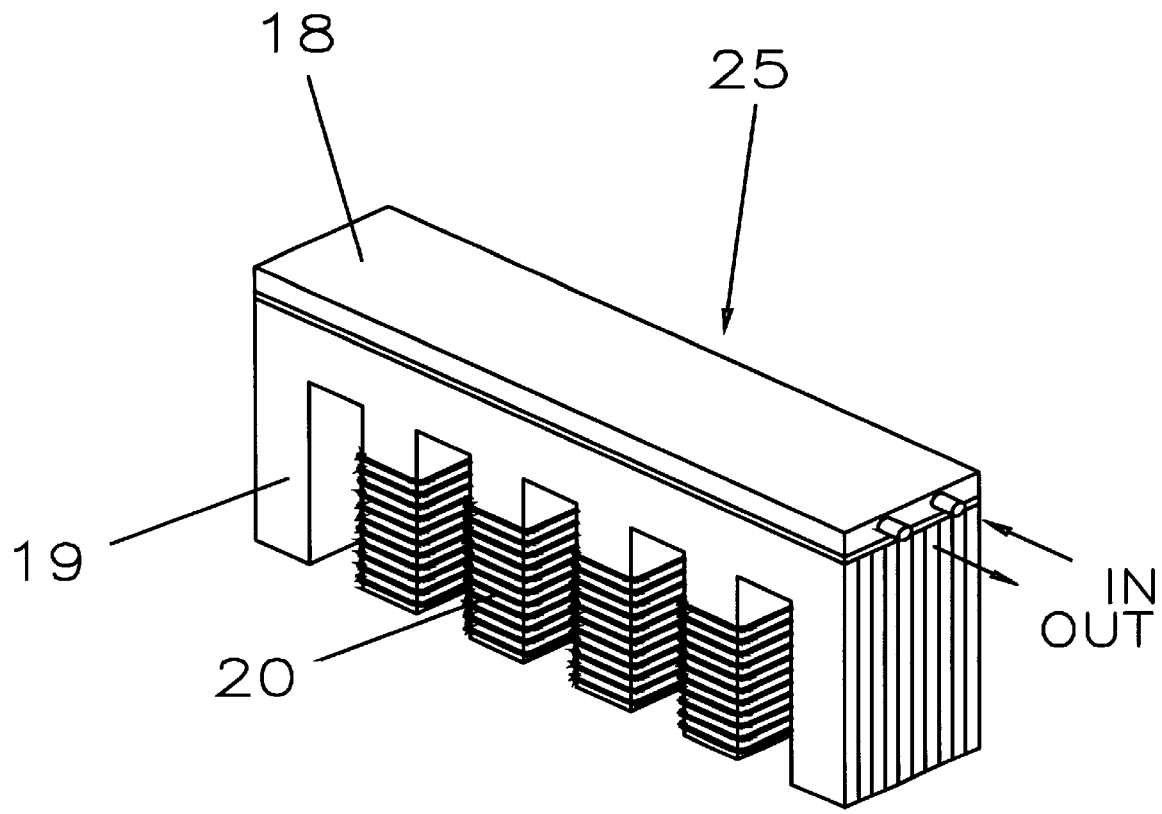
FIG. 6 is a view showing conventional means for heat dissipation in a linear motor.
Figure 7:
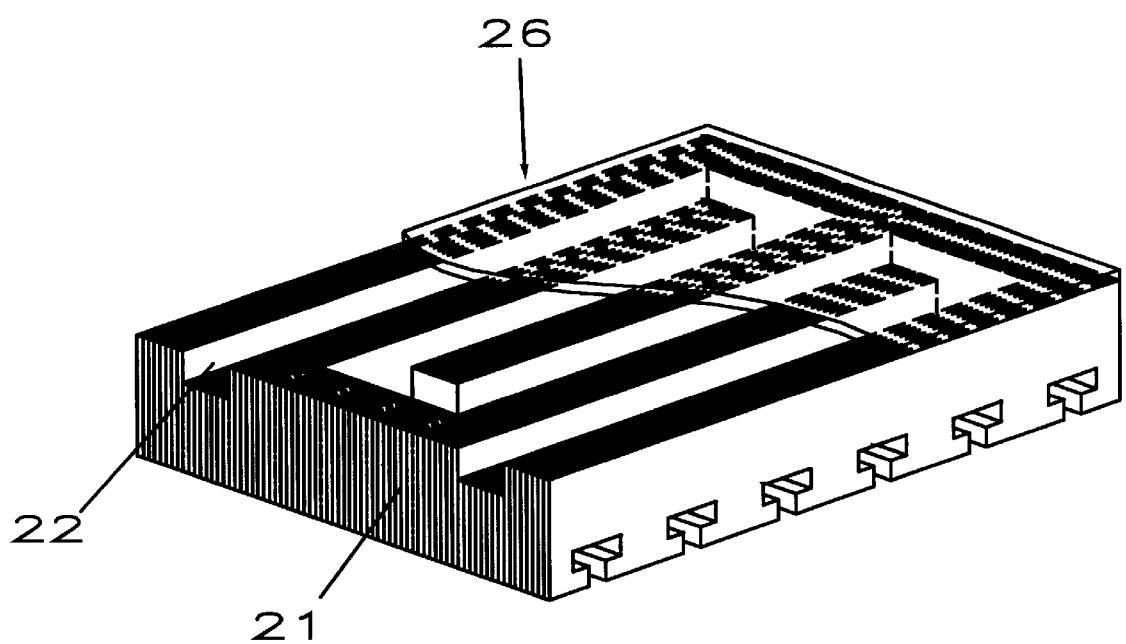
FIG. 7 is a view showing means for heat dissipation in a linear motor disclosed by U.S. Pat. No. 4,839,545.
Figure 8:
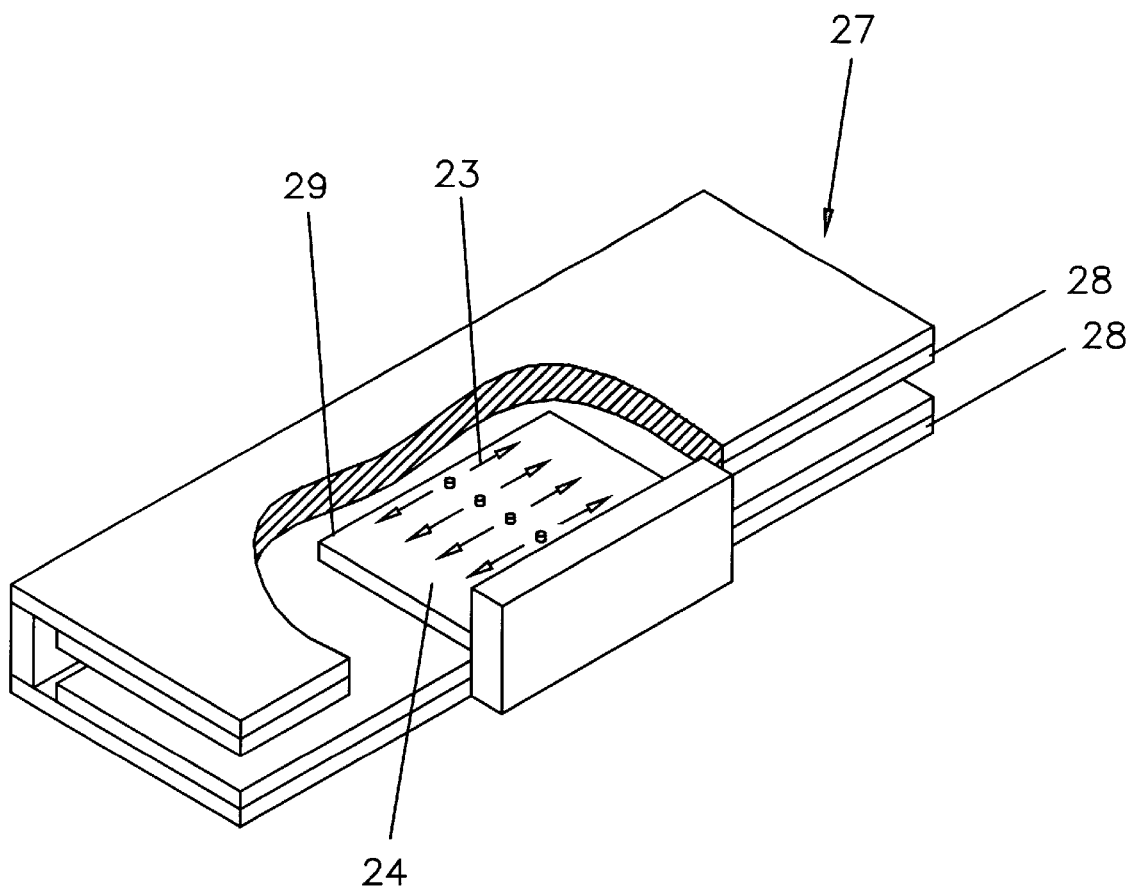
FIG. 8 is view showing means for heat dissipation in a linear motor disclosed by U.S. Pat. No. 5,703,418.

FIG. 4 is a view of a third embodiment of the present invention which is applied to a general linear pulse motor, and FIG. 5 is a cross sectional view cut along line B—B in FIG. 4. A mover 30 of the linear pulse motor includes a plurality of electromagnet units 31 with thermal conducting pipes 15, laminated sheet steels 16 and windings 32 wound around the laminated sheet steels 16. The pipes 15 are in contact with the laminated sheet steels 16 so that the heat produced by the sheet steels 16 and the windings 32 may be carried out of the mover 30. In this embodiment, when fabricating the electromagnet units 31, the thermal conducting pipes 15 are at first inlaid into the electromagnet units 31 so as to be in contact with nearby laminated sheet steel 16, and then by filling the clearances between the pipes 15 and the laminated sheet steels 16 with a thermal conducting gel so as to improve thermal conductivity of the pipes 15 and stabilize the pipes in the position. Although the pipes 15 can be enclosed in the laminated sheet steels 16, yet the configuration of the laminated sheet steel 16 shall be formed to match the contour of the pipes 15 resulting in increasing production cost.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A motor with improved heat dissipation effect comprising:

a stator having a magnetic field or a passage of varying magnetic reluctance;

a mover having at least one winding and at least one thermal conducting pipe and an insulation material;

said at least one winding is formed of a metallic conductor of excellent electric conductivity, and is able to provide the motor with an electromagnetic field;

said insulation material having poor electric conductivity is enclosing said at least one winding;

said at least one thermal conducting pipe made of materials of excellent thermal conductivity is formed hollow and filled with an easily evaporative liquid and a substance with capillary characteristics, and is maintained at an inner pressure below 0.5 atmospheric pressure at room temperature;

a portion of said at least one thermal conducting pipe is installed in the inner part of said insulation material, and rest of said at least one thermal conducting pipe is stretched out of said insulation material.

2. The motor of claim 1, wherein said mover contains laminated silicon sheet steels for providing a passage for magnetic fluxes and intensifying strength of the magnetic field.

3. The motor of claim 1, wherein a thermal conducting gel having excellent thermal conductivity fills the surrounding areas of said at last one thermal conducting pipe.

4. The motor of claim 1, wherein said at least one thermal conducting pipe is in contact with a metallic heat dissipation plate.

5. The motor of claim 4, wherein the surface of said matallic heat dissipation plate has a plurality of fins.

6. The motor of claim 4, wherein said metallic heat dissipation plate is in contact with said at least one thermal conducting pipe with a recirculating refrigerant.

7. The motor of claim 1, wherein said motor is a linear servo motor with a core.

8. The motor of claim 1, wherein said motor is a linear pulse motor with a core.

9. The motor of claim 1, wherein said motor is a coreless linear servo motor.

10. The motor of claim 1, wherein said motor is a rotating motor.

* * * * *